United States Patent [19]

Saito

[11] Patent Number: 5,251,962
[45] Date of Patent: Oct. 12, 1993

[54] SEAT BACK STRUCTURE IN VEHICLE SEAT
[75] Inventor: Tetsuo Saito, Akishima, Japan
[73] Assignee: Tachi-S Co. Ltd, Akishima, Japan
[21] Appl. No.: 794,429
[22] Filed: Nov. 19, 1991
[51] Int. Cl.$^5$ .............................................. A47C 7/42
[52] U.S. Cl. ............................ 297/440.15; 297/219.1; 297/452.1
[58] Field of Search ............... 297/444, 440, 452, 230, 297/219, 223; 403/405.1, 407.1, 52, 119; 24/293, 296

[56] References Cited

U.S. PATENT DOCUMENTS

| | | | |
|---|---|---|---|
| 2,191,848 | 2/1940 | Cramer et al. | 297/219 |
| 2,313,637 | 3/1943 | Geer | 403/405.1 X |
| 2,703,912 | 3/1955 | Tinnerman et al. | 403/407.1 |
| 3,736,022 | 5/1973 | Radke | 297/453 |
| 3,915,493 | 10/1975 | Brown | 297/440 X |
| 4,234,976 | 11/1980 | Litkewycz | 297/440 X |
| 4,565,465 | 1/1986 | Oberst | 403/407.1 |
| 4,583,782 | 4/1986 | Mikuniya | 297/440 |
| 4,826,078 | 5/1989 | Arvin et al. | 403/405.1 X |
| 4,832,400 | 5/1989 | Aoki et al. | 297/284 |
| 4,840,430 | 6/1989 | Shimada | 297/452 |
| 4,971,380 | 11/1990 | Cote et al. | 297/444 X |

FOREIGN PATENT DOCUMENTS 2060367 5/1981 United Kingdom ............... 297/444

Primary Examiner—Kenneth J. Dorner
Assistant Examiner—Milton Nelson, Jr.
Attorney, Agent, or Firm—Oldham, Oldham & Wilson Co.

[57] ABSTRACT

A seat back structure for vehicle seat which includes a separated mat member received into a recessed area in the seat back body which incorporates a male latch member formed by being punched out from a part of a plate frame provided in the seat back so as to project outwardly for latching engagement by a female member attached to a separate mat, and that the female latch member has a width greater than an opening defined in the punched-out part of the plate frame to thereby avoid any direct contact of the male member with the edges of the opening, to thus suppresses the noise between the two latch members. This problem occurs in these types of seats normally as an occupant leans back in the seat and there is a relative movement between the separate mat member and the vehicle seat. The purpose of the invention is to suppress or avoid noise because of relative movement between the two latch members.

4 Claims, 2 Drawing Sheets

SEAT BACK STRUCTURE IN VEHICLE SEAT

BACKGROUND OF THE INVENTION

1. Field of the Invention

The present invention relates to a seat back of a vehicle seat, and in particular relates to a seat back structure in the seat wherein a separate mat member is fitted in the recessed area formed in the frontal surface of seat back.

2. Description of Prior Art

Among hitherto seat back structures in vehicle seats, there has been a seat having such seat back structure wherein a separate mat member is fitted in the recessed area of the seat back by means of a hook-like male latch member and a wire female latch member, which are latched together for securing the separate mat member onto the recessed area of the seat back. This sort of seat back structure is known from the U.S. Pat. application No. 706,223 to the assignee, an owner of the present invention. For a brief explanation of that prior art, reference is made to FIGS. 1 and 2, which show a seat back structure including a seat back body (SB) formed by a covering member (11) and cushion member (12), an integral head rest (HR), an air ventilation opening (H) defined between the seat back body (SB) and headrest (HR), a recessed area (12b) formed in the frontal surface of the seat back body (SB), and a separate mat member (M). Within the seat back body (SB), there is embedded a seat back frame (13), and further within the upper part of the cushion member (12), there is embedded a plate frame member (14) extending between both lateral frame sections of the seat back frame (13). The plate frame member (14) is formed with a pair of spaced-apart male latch members (15)(15) of a hook-like shape. Each of the male latch members (15)(15) is formed by punching out the corresponding part of the plate frame member (14) in the outward direction, with a reinforcing bead (15b) formed centrally of the latch member (15) and with a stopper lug (15a) formed at both lateral edges of the same latch member (15). Designation (14a) denotes an opening which is left after forming the latch member (15). As shown, a pair of spaced-apart cut-away areas (12c) (12c) are formed at the foregoing upper part of cushion member (12), whereupon the two male latch members (15) (15) are respectively projected in the respective two cut-away areas (12c) (12c). Designations (11) (11) denote a pair of lateral bolster portions of the seat back (SB). The mat member (M) comprises a cushion member (20), a frame (24) embedded therein, a covering member (21) affixed over the cushion member (20), and a securing wire (24). The securing wire (24) is formed such that its both ends are embedded in the cushion member (20) and welded to the respective lateral frame sections of frame (24), and its center portion is bent into a pair of spaced-apart U-shaped female latch members (23) (23), which are exposed upon the rear surface of cushion member (20). The two female latch members (23) (23) are disposed at the upper part of cushion member (20) corresponding to the two male latch members (15) (15) of seat back body (SB).

Thus, according to this prior art, the mat member (M) is secured in the recessed area (12b) of seat cushion body (SB) by engaging the female latch members (23) (23) over the male latch members (15) (15), respectively, and connecting the lower extension cloth (25) of mat member (M) with that (16) of seat back body (SB), using a suitable securing member such as hog rings.

Referring now to FIG. 2, the female latch member (23) has a width (W1) slightly smaller than that (W2) of male latch member (15). When the former (23) is engaged over the latter (15), in normal cases, the horizontal portion of the former is engaged with the two stopper lugs (15a) of the latter. Thus, the female latch member (23) is prevented by the stopper lugs (15a) against removal from the male latch member (15). However, it is found that an external load applied from the back of an occupant sitting on the seat to the mat member (M) or repeated vibrations given thereto will bring the female latch member (23) out of the stopper lugs (15a) into contact with both lateral edges 14b of opening (14a) of plate frame (14), emitting an unpleasant noise therefrom.

SUMMARY OF THE INVENTION

In view of the foregoing shortcoming, it is therefore a purpose of the present invetion to provide a seat back structure in a vehicle seat which avoids the above-mentioned unpleasant noise which will occur by the contact of female latch member with both lateral edges of the openings of the plate frame member in the seat back.

To accomplish this purpose, according to the present invention, a female latch member is provided at a separate mat member, which has a latch part of a greater width than the width of the opening formed in the plate frame member in the seat back. Thus, the female latch member extends across the opening, to thereby have no keen contact point therewith, whereby no unpleasant noise is emitted therefrom.

Another purpose of the invention is to avoid undesired movements of the female latch member within the male latch member, so as to eliminate a hard touch of the female latch member through the mat member.

To this end, a securing pawl means is provided at the male latch member in such a manner to retain the female latch member against movement towards and away from the plate frame.

DETAILED DESCRIPTION OF PREFERRED EMBODIMENT OF THE INVENTION

Figure 1:
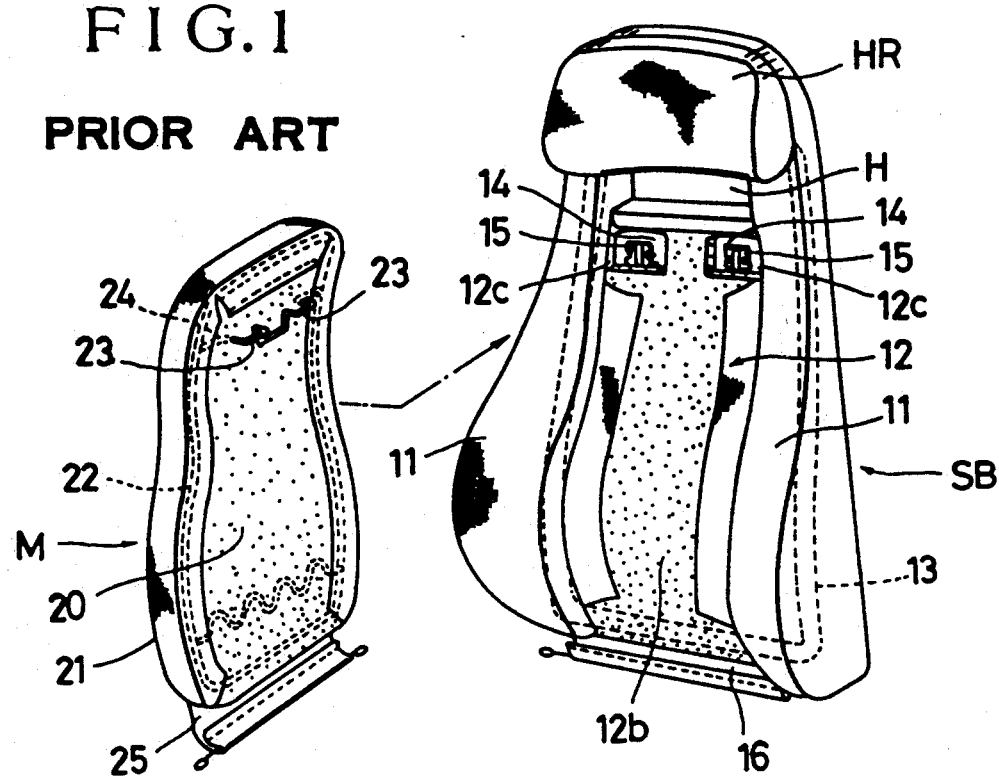
FIG. 1 is a perspective view of a conventional seat back structure.
Figure 2:
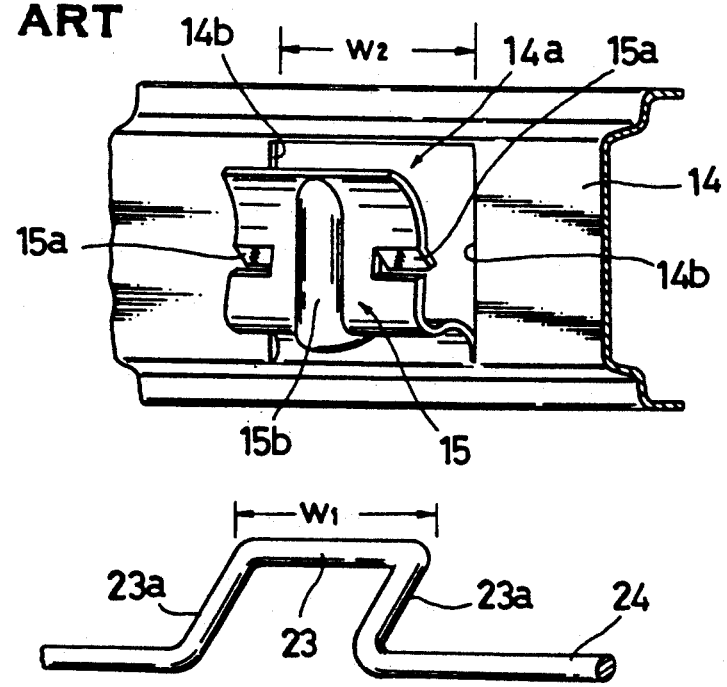
FIG. 2 is an exploded schematic perspective view of female and male latch members as in FIG. 1.
Figure 3:
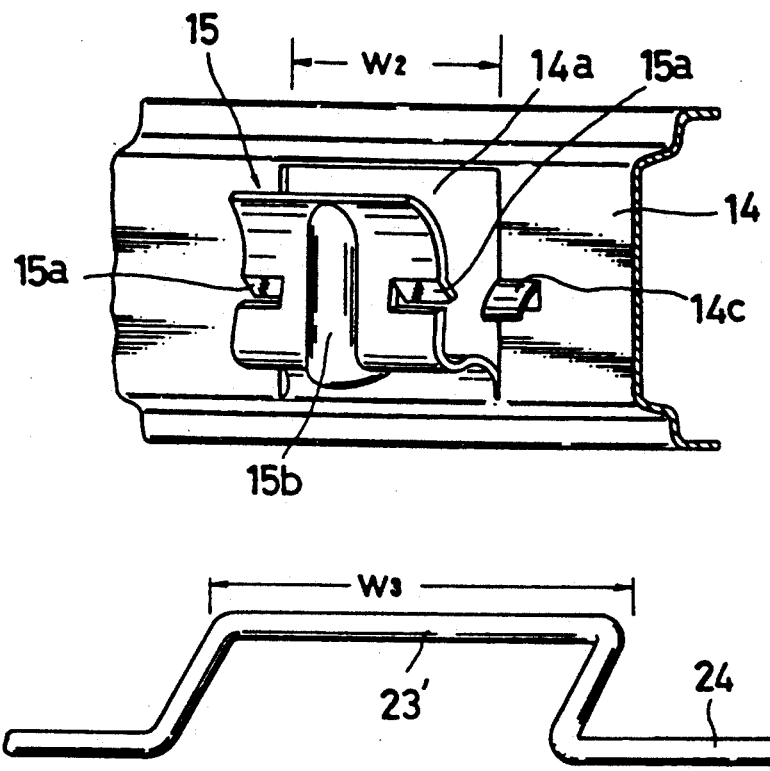
FIG. 3 is an exploded schematic perspective view of female and male latch members in accordane with the present invention.
Figure 4:
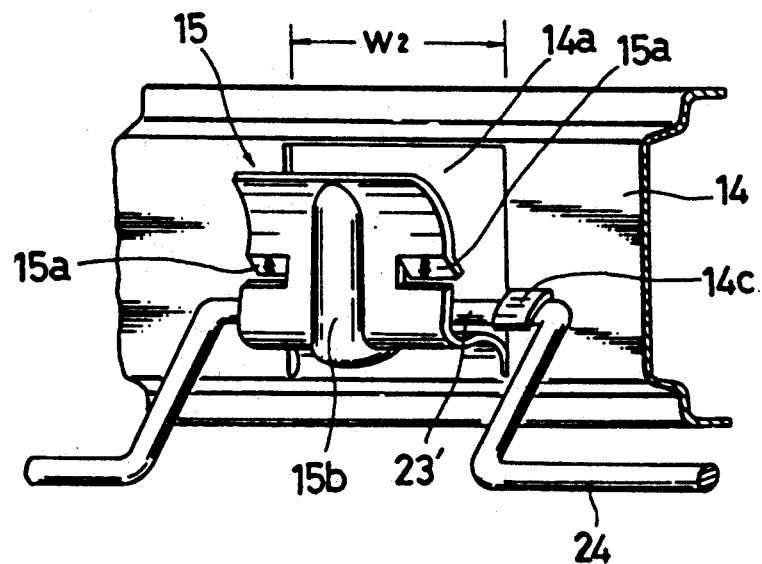
FIG. 4 is a perspective view similar to that in FIG. 3 showing the assembled state of latch members.

FIGS. 3 and 4 illustrate a principal part of the seat back structure in accordance with the present invention, which is an improvement directly based on the previously described seat back structure. Thus, all like designations in the prior art description correspond to all like designations given in the present description.

According to the present invention, the securing wire member (24) is so modified as to have a female latch portion (23') whose width (W3) is greater than that (W2) of the opening (14a) in the plate frame member (14). Further, a securing pawl (14c) is formed at each of the lateral edges which bound on the opposite sides of opening (14a), as can be seen in FIGS. 3 and 4. The formation of such securing pawl (14c) is by punching out the corresponding part of plate frame (14) adjoining the lateral edge thereof, in the outward direction, as shown.

As shown in FIG. 4, the female latch portion (23') of the wire member (14) is engaged over the male latch member (14) and also engaged into the two securing pawls (14c) (though not clearly shown).

Accordingly, it is appreciated that the horizontal portion of female latch portion (23') extends or transverses over the opening (14a) of plate frame (14), thus avoiding a keen contact of that particular female latch portion with the both lateral edges of plate frame (14), so as to effectively suppress any unpleasant contact noises therefrom, and that the horizontal portion of female latch portion (23') is retained by the securing pawls (14c) for contact with the frontal surface of plate frame (14), which prevents repeated movements of the same (23') towards and from the plate frame (14) due to vibration or rolling that occurs during running of vehicle.

It is noted that the securing pawls (14c) may not necessarily be formed for the above purpose, because a load applied from the back of an occupant on the seat to the mat member (M) serves to normally bias the female latch portion (23') into contact with the frontal surface of plate frame (14).

It is also appreciated that the U-shaped projecting configuration of female latch portion (23') acts as a spacer between the plate frame (14) and inner wall of mat member (M), thereby preventing the male latch member (15) from being felt through the mat member by an occupant leaning against the seat back (SB).

The present invention is not limited to the illustrated embodiment, but any other modifications, replacements and additions may structurally be possible without departing from the spirit and scope of the appended claims.

What is claimed is:

1. A seat back structure in a vehicle seat, in which a separate mat member is fitted in a recessed area formed in a frontal surface of the seat back structure, said seat back structure comprising:
    a plate frame provided in said recessed area of said seat back structure;
    an outwardly extending male latch member which is formed by punching out a portion of said plate frame so as to project outwardly in a hook shape;
    an opening which is defined in said plate frame at the location of said male latch member, wherein said opening has a width defined by the edges thereof;
    a generally U-shaped female latch member provided at a rear wall of said separate mat member, said female latch member being latchingly engageable with said male latch member and having a width greater than said width of said opening,
    whereby, when fitting said mat member into said recessed area of said seat back structure, said female latch member is latching engaged with said male latch member, said female latch member extending transversely over said opening to avoid contact of said female latch member with said edges of said opening.

2. The seat back structure as defined in claim 1, wherein said female latch member extends transversely over said opening so as to contact a frontal surface of said plate frame.

3. A seat back in a vehicle seat, in which a separate mat member is fitted in a recessed area formed in a frontal surface of the seat back, said seat back comprising:
    a plate frame provided in said recessed area of said seat back;
    at least one male latch member extending outwardly from said plate frame, said at least one male latch member projecting outward in a hook shape from said plate frame;
    an opening which is defined in said plate frame at a position adjacent a rearward portion of said male latch member, wherein said opening has a width defined between both lateral edges thereof;
    at least one pair of outwardly extending securing pawls formed in association with said plate frame such that one of said securing pawls is disposed on opposite sides of said opening adjacent the respective lateral edges of said opening;
    at least one generally U-shaped female latch member provided at a rear wall of said separate mat member, said female latch member being latchingly engageable with said male latch member and having a width greater than said width of said opening;
    whereby, when fitting said mat member into said recessed area of said seat back, said at least one female latch member is latchingly engaged with said at least one male latch member, extending transversely over said opening to avoid contact of said female latch member with said edges of said opening and further said at least one female latch member is retained by said at least one pair of securing pawls against a frontal surface of said plate frame.

4. The seat back of claim 3, wherein,
said at least one pair of securing pawls will prevent movement of said at least one female latch member relative to said plate frame.

* * * * *